US010725560B2

(12) United States Patent
Lee et al.

(10) Patent No.: US 10,725,560 B2
(45) Date of Patent: Jul. 28, 2020

(54) ELECTRONIC DEVICE AND METHOD CONTROLLING ACCESSORY

(71) Applicant: Samsung Electronics Co., Ltd., Suwon-si, Gyeonggi-do (KR)

(72) Inventors: Sang Soo Lee, Seoul (KR); Byung Soo Kwak, Hwaseong-si (KR); Li Yeon Kang, Yongin-si (KR); Jin Heung Kim, Suwon-si (KR); Min Jong Lim, Suwon-si (KR); Jae Hoon Choi, Gumi-si (KR); Jin Keun Park, Daegu (KR); Jong Chul Choi, Suwon-si (KR); Chang Ryong Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 115 days.

(21) Appl. No.: 15/766,350

(22) PCT Filed: Oct. 5, 2016

(86) PCT No.: PCT/KR2016/011137
§ 371 (c)(1),
(2) Date: Apr. 5, 2018

(87) PCT Pub. No.: WO2017/061766
PCT Pub. Date: Apr. 13, 2017

(65) Prior Publication Data
US 2018/0292915 A1 Oct. 11, 2018

(30) Foreign Application Priority Data
Oct. 5, 2015 (KR) .................. 10-2015-0140014

(51) Int. Cl.
*G06F 1/16* (2006.01)
*G06F 3/0346* (2013.01)
(Continued)

(52) U.S. Cl.
CPC .......... *G06F 3/0346* (2013.01); *G06F 1/1656* (2013.01); *G06F 3/017* (2013.01);
(Continued)

(58) Field of Classification Search
None
See application file for complete search history.

(56) References Cited

U.S. PATENT DOCUMENTS 8,939,814 B2   1/2015  Kweon et al.
2013/0257582 A1  10/2013  Rothkopf et al.
(Continued)

FOREIGN PATENT DOCUMENTS

CN   101732873 A   6/2010
CN   103801074 A   5/2014
(Continued)

OTHER PUBLICATIONS

ISA/KA, "International Search Report and Written Opinion of the International Searching Authority," International Application No. PCT/KR2016/011137, dated Jan. 9, 2017, 10 pages.
(Continued)

Primary Examiner — Brian M Butcher

(57) ABSTRACT

An electronic device includes an input/output interface capable of being electrically connected to a 3-dimensional movable accessory and a processor electrically connected to the input/output interface. The processor is configured to sense an event generated in the electronic device and to transmit a command to operate the accessory to the accessory through the input/output interface in response to the event.

11 Claims, 13 Drawing Sheets

(51) Int. Cl.
*H04M 19/04* (2006.01)
*H04M 1/725* (2006.01)
*H04M 1/18* (2006.01)
*G06F 3/16* (2006.01)
*H04M 1/73* (2006.01)
*G06F 3/01* (2006.01)
*G06F 3/038* (2013.01)
*H04B 1/3888* (2015.01)

(52) U.S. Cl.
CPC .............. *G06F 3/038* (2013.01); *G06F 3/16* (2013.01); *H04M 1/185* (2013.01); *H04M 1/72519* (2013.01); *H04M 1/72527* (2013.01); *H04M 1/73* (2013.01); *H04M 19/04* (2013.01); *H04B 1/3888* (2013.01); *H04M 2250/12* (2013.01)

(56) References Cited

U.S. PATENT DOCUMENTS

2014/0134918 A1   5/2014   Kweon et al.
2015/0301610 A1*  10/2015  Elangovan ............. G06F 3/017
                                                345/158
2016/0018223 A1*  1/2016   Stryker ................. G06F 3/016
                                                73/504.18

FOREIGN PATENT DOCUMENTS

| CN | 104767845 A       | 7/2015 |
|----|-------------------|--------|
| KR | 20-0263149 Y1     | 2/2002 |
| KR | 10-2012-0004640 A | 6/2012 |
| KR | 20-2012-0004640 U | 6/2012 |
| KR | 10-2015-0026580 A | 3/2015 |
| KR | 10-2015-0069740 A | 6/2015 |

OTHER PUBLICATIONS

Office Action dated Dec. 2, 2019 in connection with Chinese Patent Application No. 201680058473.4, 17 pages.

\* cited by examiner

ELECTRONIC DEVICE AND METHOD CONTROLLING ACCESSORY

CROSS-REFERENCE TO RELATED APPLICATIONS AND CLAIM OF PRIORITY

This application is a 371 of International Application No. PCT/KR2016/011137, filed Oct. 5, 2016, which claims priority to Korean Patent Application No. KR 10-2015-0140014, filed Oct. 5, 2015, the disclosures of which are herein incorporated by reference in their entirety.

TECHNICAL FIELD

The present disclosure relates to a technology that controls an accessory connected to an electronic device.

BACKGROUND

With the development of electronic technologies, various types of electronic products are being developed and distributed. In particular, a portable electronic device such as a smartphone, a tablet PC, or the like has recently come into wide use.

The above-mentioned portable electronic device includes a display, and the size of the display has gradually increased. The glass cover has been increasingly employed on the rear surface as well as the front surface of an electronic device.

SUMMARY

A portable electronic device may be mainly used while a user is moving. As such, a moving user may frequently drop the electronic device, and thus, the electronic device is frequently damaged.

If a protective case is used to prevent breakage of the electronic device, the design of the electronic device itself may be masked and the grip of the electronic device may become uncomfortable. In addition, even though the protective case is used, the cover glass may be damaged if the cover glass that is not covered with the protective case collides with the ground.

In the meantime, an accessory that reduces the falling speed of an electronic device using an air resistance may not sufficiently reduce the falling speed of the electronic device so as to prevent breakage of the electronic device.

Accordingly, an aspect of the present disclosure is to provide an electronic device and a method that are capable of controlling an accessory connected to the electronic device to minimize the impact on the electronic device if an electronic device falls.

According to various embodiments of the present disclosure, an electronic device includes an input/output interface capable of being electrically connected to a 3-dimensional movable accessory and a processor electrically connected to the input/output interface. The processor is configured to sense an event generated in the electronic device and to transmit a command to operate the accessory to the accessory through the input/output interface in response to the event.

According to various embodiments of the present disclosure, a method performed by an electronic device includes sensing an event generated in the electronic device and transmitting a command to operate a 3-dimensional movable accessory electrically connected to the electronic device, to the accessory in response to the event.

According to various embodiments of the present disclosure, a system including an electronic device and an accessory electrically connected to the electronic device includes an input/output interface and a processor electrically connected to the input/output interface. The accessory includes a connection part electrically connected to the input/output interface and a movement part electrically connected to the connection part. The processor is configured to sense an event generated in the electronic device and to transmit a command to operate the accessory, to the accessory through the input/output interface in response to the event, and the movement part is configured to move the accessory 3-dimensionally in response to the command received through the connection part.

Other aspects, advantages, and salient features of the disclosure will become apparent to those skilled in the art from the following detailed description, which, taken in conjunction with the annexed drawings, discloses various embodiments of the present disclosure.

According to various embodiments of the present disclosure, if an electronic device falls, an accessory connected to the electronic device may operate, thereby the falling speed of the electronic device being reduced. In addition, the electronic device may fall in a direction for reducing the impact applied to the electronic device.

Furthermore, an accessory may be controlled such that different operations are performed depending on a type of an event generated in an electronic device, thereby a notification associated with the occurrence of an event being provided to a user far away from the electronic device.

Besides, a variety of effects directly or indirectly understood through this disclosure may be provided.

DETAILED DESCRIPTION

Figure 1:
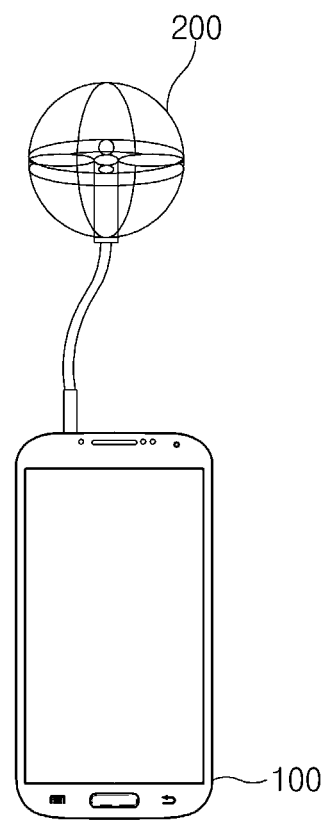
FIG. 1 illustrates an environment in which an electronic device operates, according to various embodiments of the present disclosure.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

Figure 2:
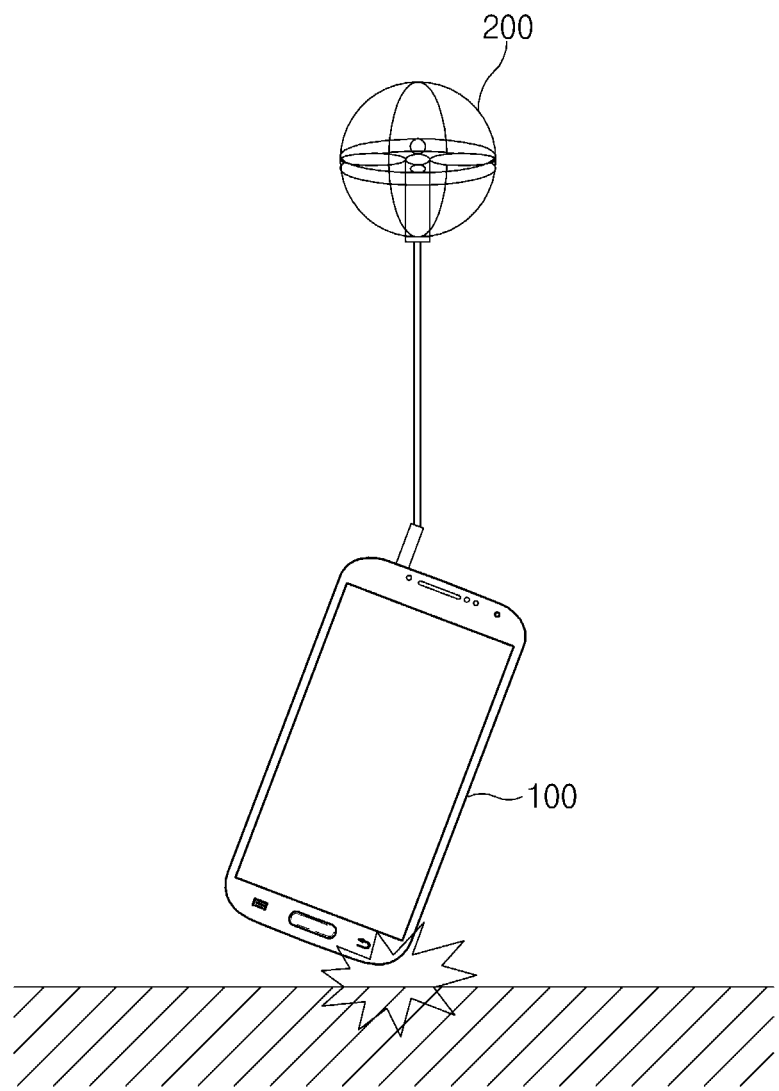
FIG. 2 illustrates an environment in which an electronic device operates, according to various embodiments of the present disclosure.

FIGS. 1 and 2 illustrate an environment in which an electronic device operates, according to various embodiments of the present disclosure.

Referring to FIG. 1, an electronic device 100 may be electrically connected to an accessory 200. According to an embodiment, the electronic device 100 may be connected to the accessory 200 through an ear jack. The electronic device 100 may transmit a command to operate the accessory 200, to the accessory 200 through the ear jack.

For example, the accessory 200 may include a propeller configured to generate lift force. If the command is transmitted from the electronic device 100, the propeller of the accessory 200 may be rotated to generate the lift force.

According to an embodiment, the accessory 200 may rotate the propeller by itself without receiving the command from the electronic device 100.

Referring to FIG. 2, if the electronic device 100 falls, the electronic device 100 may transmit the command to operate the accessory 200, to the accessory 200.

For example, the electronic device 100 may sense the acceleration or angular velocity of the electronic device 100. For example, if the acceleration is a value close to the acceleration of gravity, the electronic device 100 may determine that the electronic device 100 is in a free-fall state. For another example, if the acceleration or angular velocity is greater than a predetermined value, the electronic device 100 may determine that the electronic device 100 is in a falling state. If the electronic device 100 is in the falling state, the electronic device 100 may transmit a command to rotate the propeller of the accessory 200, to the accessory 200.

The accessory 200 may rotate the propeller depending on the command received from the electronic device 100. If the propeller of the accessory 200 rotates, the lift force in a direction opposite to the falling direction of the electronic device 100 may be generated.

According to an embodiment, the accessory 200 may sense the acceleration or angular velocity of the accessory 200 through one or more sensors included in the accessory 200 and may rotate the propeller based on the acceleration or the angular velocity.

The falling speed of the electronic device 100 may be reduced by the lift force generated through the rotation of the propeller. In addition, the falling direction of the electronic device 100 may be controlled by the lift force generated through the rotation of the propeller. For example, the electronic device 100 may fall such that the edge portion of the electronic device 100 collides with the ground by the operation of the accessory 200 controlled by the electronic device 100. The falling direction may be controlled, and thus the impact force upon dropping of the electronic device 100 may be reduced.

Figure 3:
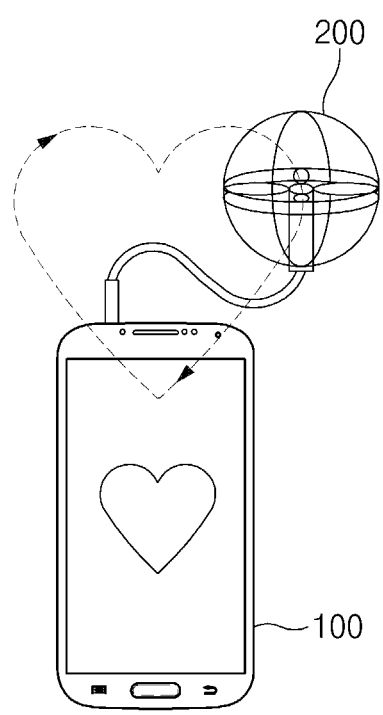
FIG. 3 is illustrates an environment in which an electronic device operates, according to various embodiments of the present disclosure.

FIG. 3 illustrates an environment in which an electronic device operates, according to various embodiments of the present disclosure.

Referring to FIG. 3, the electronic device 100 may receive a message including a drawing by the user of another electronic device, from another electronic device. For the purpose of notifying a user of the electronic device 100 of the content of a message, the electronic device 100 may transmit a command to operate the accessory 200, to the accessory 200. The electronic device 100 may transmit, to the accessory 200, a command including information about the trajectory of the drawing such that the accessory 200 is capable of moving along the trajectory of the drawing included in the message. The accessory 200 may operate so as to notify the user of the reception of the message, by the received command. The accessory 200 may move along the trajectory of the drawing included in the message. The user may see the motion trajectory of the accessory 200 to verify the reception of the message remotely and may verify the trajectory of the drawing included in the message.

Figure 4:
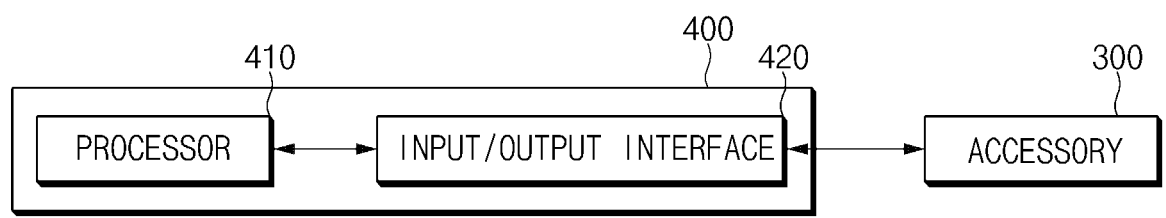
FIG. 4 is a block diagram illustrating a configuration of an electronic device, according to various embodiments of the present disclosure.

FIG. 4 is a block diagram illustrating a configuration of an electronic device, according to various embodiments of the present disclosure.

Referring to FIG. 4, an electronic device 400 according to various embodiments of the present disclosure may include a processor 410 and an input/output interface 420. The electronic device 400 may be electrically connected to an accessory 300 through the input/output interface 420.

The electronic device 400 may sense the generated event and may control the accessory 300 in response to the generated event.

The processor 410 may obtain an event generated in the electronic device 400.

According to an embodiment, if the electronic device 400 falls, the processor 410 may obtain the acceleration or angular velocity of the electronic device 400 to determine that the electronic device 400 is in a falling state.

According to an embodiment, for example, the processor 410 may obtain an event such as message reception, a push notification, call reception, or the like.

The processor 410 may generate a command to control the accessory 300 to transmit the command to the accessory 300 through the input/output interface 420, in response to the generated event.

According to an embodiment, if it is determined that the electronic device 400 is in the falling state, the processor 410 may transmit a command, which allows the accessory 300 to generate force in a direction opposite to the falling direction of the electronic device 400, to the accessory 300. For example, if it is determined that the electronic device 400 is in the falling state, the processor 410 may transmit a command to rotate the rotor (e.g., propeller) of the accessory 300, to the accessory 300. For another example, if it is determined that the electronic device 400 is in the falling state, the processor 410 may transmit a command to rotate the frame of the accessory 300, to the accessory 300 for the purpose of maintaining the balance of the accessory 300.

According to an embodiment, for example, if an event such as message reception, a push notification, call reception, or the like is sensed, the processor 410 may transmit a command to operate the accessory 300, to the accessory 300 for the purpose of notifying a user that the event occurs. According to an embodiment, the processor 410 may determine a type of the obtained event and may transmit different commands depending on the type of the event. For example, if a message is received, the processor 410 may transmit a command to operate the accessory 300, to the accessory 300 such that the accessory 300 moves along square trajectory. The event may be audio output, camera shooting, user authentication, or ambient environment sensing (temperature, humidity, illumination, or the like) as well as the message reception, the push notification, or the call reception.

According to an embodiment, if the event is obtained, the processor 410 may transmit a command to operate an LED or a speaker included in the accessory 300, to the accessory 300. The command to operate the speaker may include sound source data to be output through the speaker.

The input/output interface 420 may be electrically connected to the accessory 300. The input/output interface 420 may be any terminal capable of being connected to an external device included in the electronic device 400. The command to operate the accessory 300 may be transmitted to the accessory 300 through the input/output interface 420. The input/output interface 420 may be a wireless communication interface. For example, the input/output interface 420 may wirelessly transmit the command to operate the accessory 300, to the accessory 300. According to an embodiment, the input/output interface 420 may supply power to the accessory 300.

The accessory 300 may be operated by the command received from the electronic device 400. For example, the accessory 300 may be a flying object such as a drone or the like. Hereinafter, the accessory 300 will be described in detail with reference to FIG. 6.

Figure 5:
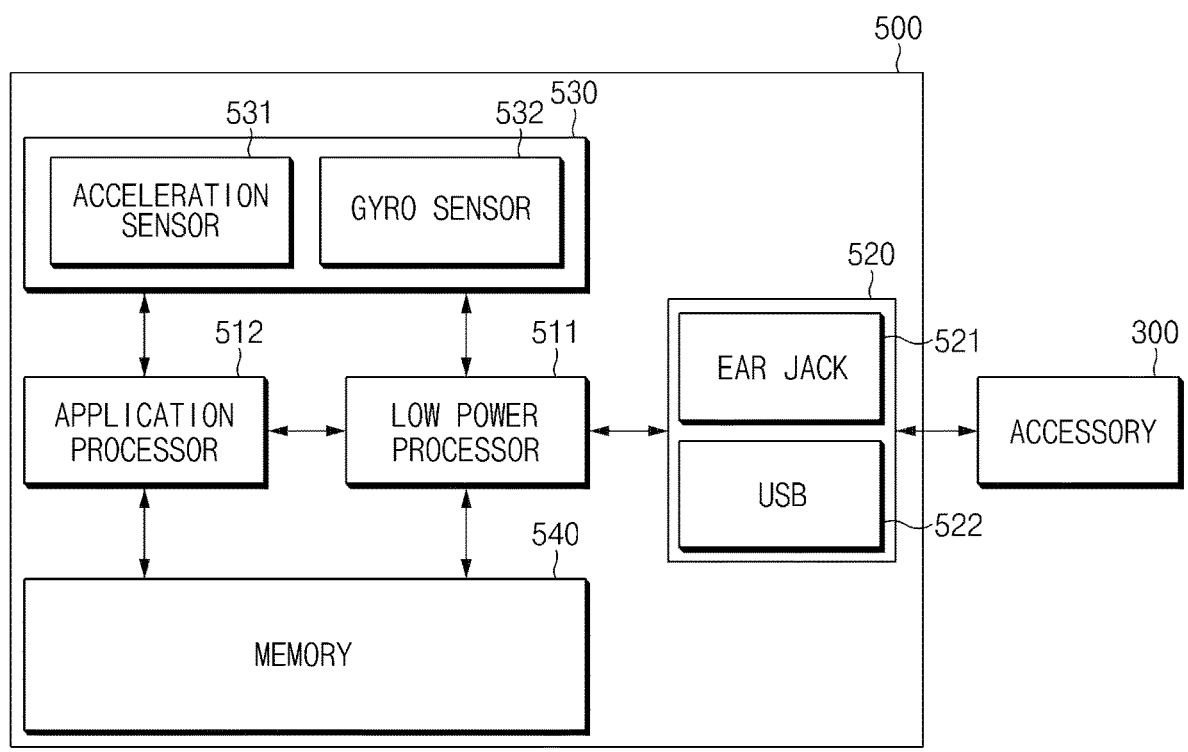
FIG. 5 is a block diagram illustrating a configuration of an electronic device, according to various embodiments of the present disclosure.

FIG. 5 is a block diagram illustrating a configuration of an electronic device, according to various embodiments of the present disclosure.

Referring to FIG. 5, an electronic device 500 according to various embodiments of the present disclosure may include a low power processor 511, an application processor 512, an input/output interface 520, one or more sensors 530, and a memory 540. The electronic device 500 may be electrically connected to the accessory 300 through the input/output interface 520.

The low power processor 511 may control the electronic device 500 in a low power mode. The low power processor 511 may receive power smaller than the power of the application processor 512 to control the electronic device 500.

According to an embodiment, in a low power mode, the low power processor 511 may determine whether an event occurs, based on data obtained through the one or more sensors 530. According to an embodiment, the low power processor 511 may determine the falling state of the electronic device 500 based on the acceleration data or angular velocity data obtained by an acceleration sensor 531 or a gyro sensor 532 included in the one or more sensors 530.

For example, if the acceleration obtained through the one or more sensors 530 is a value close to the acceleration of gravity, the low power processor 511 may determine that the electronic device 500 is in a free-fall state. If the acceleration or angular velocity is greater than a predetermined value, the electronic device 100 may determine that the electronic device 500 is in a falling state. The low power processor 511 and the one or more sensors 530 may be integrally implemented.

According to an embodiment, for example, in a low power mode, the low power processor 511 may sense an event such as message reception, a push notification, call reception, or the like.

The low power processor 511 may transmit a command to control the accessory 300, to the accessory 300 through the input/output interface 520 in response to the generated event.

According to an embodiment, if it is determined that the electronic device 500 is in the falling state, the low power processor 511 may transmit a command to operate the accessory 300 so as to generate force in a direction opposite to the falling direction of the electronic device 500, to the accessory 300. For example, if it is determined that the electronic device 500 is in the falling state, the low power processor 511 may transmit a command to rotate the rotor of the accessory 300, to the accessory 300. For another example, if it is determined that the electronic device 500 is in the falling state, the low power processor 511 may transmit a command to rotate the frame of the accessory 300, to the accessory 300 for the purpose of maintaining the balance of the accessory 300.

According to an embodiment, the low power processor 511 may load the command stored in the memory 540 to transmit the command to the accessory 300. For example, the low power processor 511 may select a command, which corresponds to the sensed event, from among commands stored in the memory 540 to transmit the command to the accessory 300.

If the application processor 512 is in a low power mode, the application processor 512 may perform the above-mentioned functions performed by the low power processor 511 in a low power mode.

The input/output interface 520 may include an ear jack 521 or a USB 522. The accessory 300 may be electrically connected to the ear jack 521 or the USB 522. The command to operate the accessory 300 may be transmitted to the accessory 300 through the ear jack 521 or the USB 522. Although not illustrated in FIG. 5, the input/output interface 520 may include a serial port.

The one or more sensors 530 may include the acceleration sensor 531 or the gyro sensor 532. If the electronic device 400 moves, the acceleration sensor 531 may sense acceleration associated with the translational movement of the electronic device 500. The acceleration data sensed by the acceleration sensor 531 may be transmitted to the low power processor 511 or the application processor 512. If the electronic device 500 moves, the gyro sensor 532 may sense angular velocity associated with the rotational movement of the electronic device 500. The angular velocity data sensed by the gyro sensor 532 may be transmitted to the low power processor 511 or the application processor 512.

The memory 540 may store command or data, which is associated with the low power processor 511, the application processor 512, the input/output interface 520, and the one or more sensors 530. For example, the memory 540 may store the acceleration data or angular velocity data sensed by the acceleration sensor 531 or the gyro sensor 532. For another example, the memory 540 may store a command transmitted from the electronic device 500 to the accessory 300. The memory 540 may store various commands corresponding to events generated in the electronic device 500, respectively.

Figure 6:
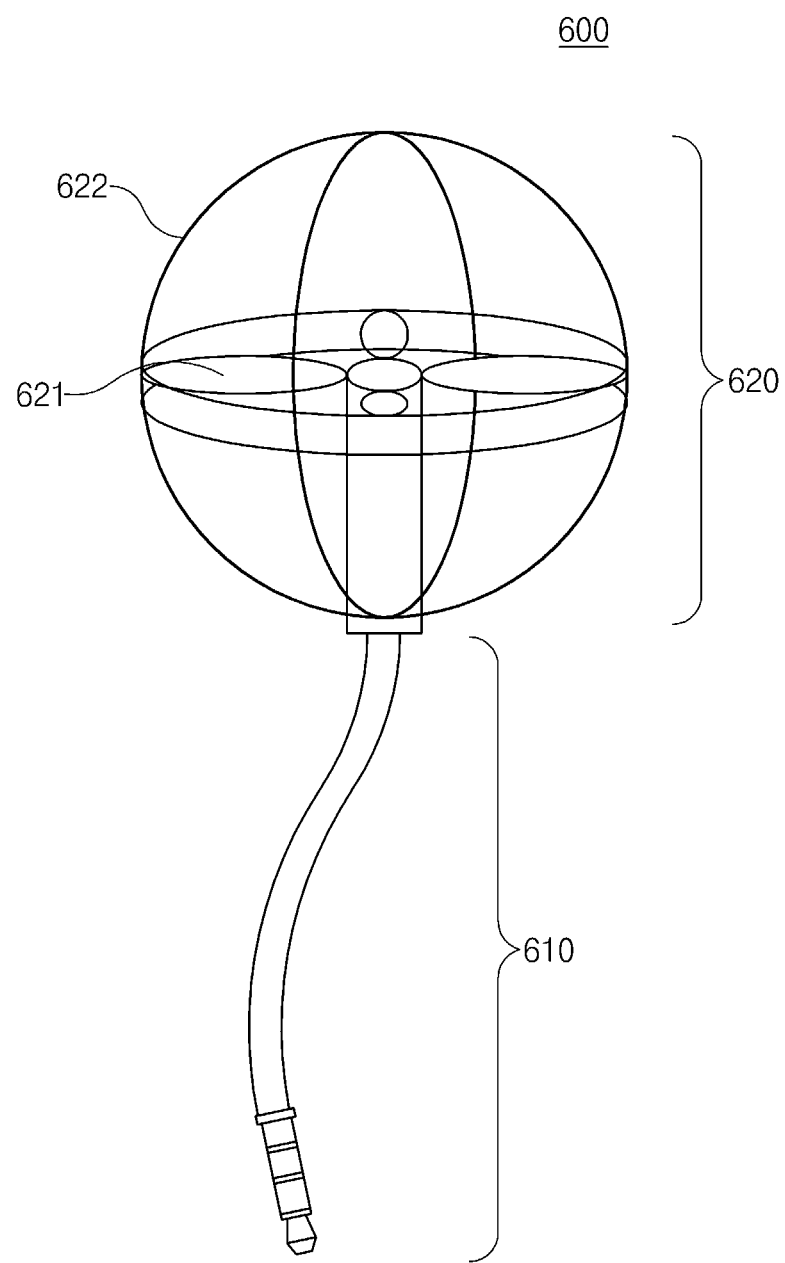
FIG. 6 is a perspective view of an accessory, according to various embodiments of the present disclosure.

FIG. 6 is a perspective view of an accessory, according to various embodiments of the present disclosure.

Referring to FIG. 6, an accessory 600 according to various embodiments of the present disclosure may include a connection part 610 and a movement part 620, and the movement part 620 may include a rotor 621 and a frame 622.

The connection part 610 may be electrically connected to an electronic device. If an event is generated in an electronic device, the connection part 610 may receive a command to operate the movement part 620, from the electronic device.

For example, if the electronic device is in a falling state, the connection part 610 may receive the command to operate the movement part 620 from the electronic device. For another example, if an event such as message reception, a push notification, call reception, or the like is generated in an electronic device, the connection part 610 may receive the command to operate the movement part 620, from the electronic device.

The connection part 610 may include a port capable of being connected to the electronic device. For example, the connection part 610 may include a plug capable of being connected to the ear jack of an electronic device. Although not illustrated in FIG. 6, the connection part 610 may include a USB port capable of being connected to a USB port of the electronic device.

The connection part 610 may include a cable that connects the port to the movement part 620. For example, the connection part 610 may include a cable that connects the movement part 620 to an ear jack plug or a USB port.

The movement part 620 may be electrically connected to the connection part 610. The movement part 620 may be configured to 3-dimensionally move an accessory in response to the command received from the electronic device. The movement part 620 may be a module configured to be able to fly.

According to an embodiment, if the electronic device is in a falling state, the movement part 620 may move the accessory 600 in a direction opposite to the falling direction of the electronic device. The accessory 600 may move in a direction opposite to the falling direction of the electronic device, and thus the falling speed of the electronic device may be reduced and the direction in which the electronic device collides with the ground may be controlled.

According to an embodiment, the movement part 620 may move the accessory 600 for the purpose of notifying a user of an event generated in the electronic device. If a command is received from the electronic device, the movement part 620 may operate such that the accessory 600 moves along the trajectory corresponding to the command. The movement part 620 may operate such that the accessory 600 moves along a trajectory, which corresponds to the received command, from among predetermined trajectories.

An embodiment is exemplified in FIG. 6 as the movement part 620 is a flying object. However, embodiments of the present disclosure may not be limited thereto. For example, the movement part 620 may be implemented with a 3-dimensional movable module.

The rotor 621 may be configured to generate lift force. The rotor 621 may be rotated in response to the command received from the electronic device. The rotor 621 may receive power from the electronic device through the connection part 610 and may be rotated. The rotor 621 may receive power from the battery embedded in the accessory 600 and may be rotated.

If the rotor 621 rotates, the lift force may be generated, and then, the accessory 600 may move in a direction. If the electronic device falls, the falling speed of the electronic device may be reduced by the lift force generated by the rotor 621. Moreover, the direction in which the electronic device collides with the ground upon falling may be controlled by the lift force generated by the rotor 621 such that the impact force applied to the electronic device is minimized.

The frame 622 may be configured to surround the rotor 621. The frame 622 may be rotated in response to the command received from the electronic device. If the frame 622 rotates, the balance of the accessory 600 may be maintained such that the lift force is generated in a direction, which is opposite to the direction of gravity, depending on the rotation of the rotor 621.

According to some embodiments, although not illustrated in FIG. 6, the accessory 600 may further include one or more sensors and processor. The one or more sensors of the accessory 600 may sense the acceleration or angular velocity of the accessory 600. The processor of the accessory 600 may determine the falling state of the accessory 600 based on the acceleration data or angular velocity data obtained by the one or more sensors of the accessory 600. If the accessory 600 is in a falling state, the processor of the accessory 600 may control the movement part 620 such that the movement part 620 moves. The processor of the accessory 600 may receive a command from the electronic device and may drive a rotor depending on the received command.

According to some embodiments, although not illustrated in FIG. 6, for example, the accessory 600 may further include an output module such as a speaker, an LED, or the like. For example, if the command is received from the electronic device, the speaker of the accessory 600 may output a notification sound for notifying a user that an event occurs. For another example, if the command is received from the electronic device, the LED of the accessory 600 may output light for notifying a user that an event occurs.

Figure 7:
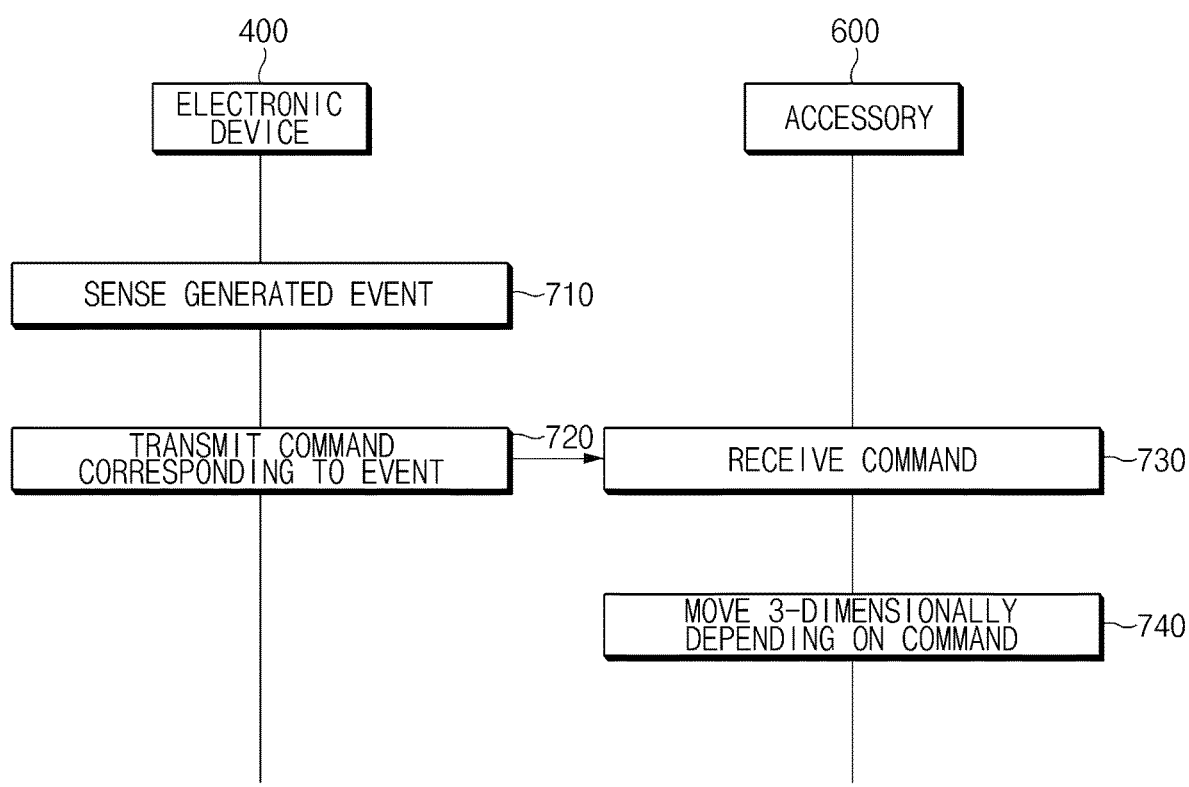
FIG. 7 is a flowchart illustrating a method of controlling an accessory, according to various embodiments of the present disclosure.

FIG. 7 is a flowchart illustrating a method of controlling an accessory, according to various embodiments of the present disclosure.

Referring to FIG. 7, in operation 710, the electronic device 400 may sense an event generated in the electronic device 400. For example, the event generated in the electronic device 400 may be an event generated by sensing the physical state of the electronic device 400 such as the drop of the electronic device 400. For another example, the event generated in the electronic device 400 may be an event, which is to be notified to a user of the electronic device 400, such as message reception, a push notification, call reception, or the like. The electronic device 400 may recognize various events generated in the electronic device 400.

In operation 720, the electronic device 400 may transmit the command corresponding to the generated event, to the accessory 600. The electronic device 400 may transmit different commands to the accessory 600 depending on a type of the generated event. For example, if the electronic device 400 is in the falling state, the electronic device 400 may transmit a command, which allows the accessory 600 to generate force in a direction opposite to the falling direction of the electronic device 400. For another example, if a call is received, the electronic device 400 may transmit a command to operate the accessory 600 along trajectory that allows a user is capable of determining a caller of the received call.

In operation 730, the accessory 600 may receive the command transmitted from the electronic device 400.

In operation 740, the accessory 600 may move depending on the received command. For example, the accessory 600 may rotate a rotor so as to generate force in a direction opposite to the falling direction of the electronic device 400. For another example, the accessory 600 may move along the trajectory corresponding to the received command.

Figure 8:
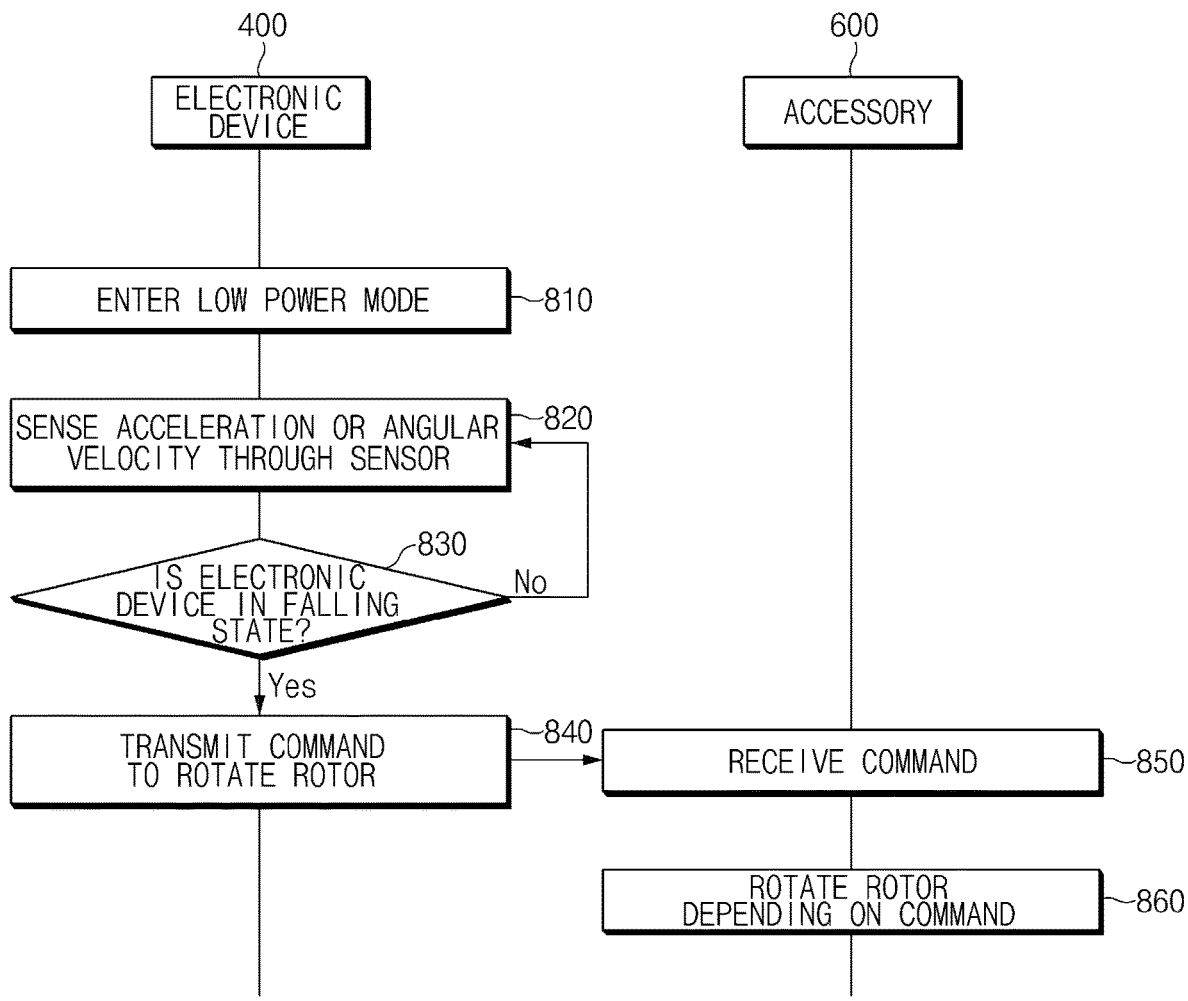
FIG. 8 is a flowchart illustrating a method of controlling an accessory, according to various embodiments of the present disclosure.

FIG. 8 is a flowchart illustrating a method of controlling an accessory, according to various embodiments of the present disclosure. For convenience of description, a description duplicated with an operation described with reference to FIG. 7 will not be repeated here.

The flowchart illustrated in FIG. 8 may include operations that the electronic device 400 or 500 and the accessory 600 illustrated in FIGS. 4 to 6 process. Even though omitted below, details about the electronic device 400, the electronic device 500, and the accessory 600 described with reference to FIGS. 4 to 6 may be applied to the flowchart illustrated in FIG. 8.

Referring to FIG. 8, in operation 810, the electronic device 400 may enter a low power mode. For example, if the electronic device 400 does not receive an input from a user during the predetermined time, the electronic device 400 may enter the low power mode. For another example, if the electronic device 400 receives an input associated with the power button of the electronic device 400 from the user, the electronic device 400 may enter the low power mode.

In operation 820, the electronic device 400 may sense acceleration or angular velocity through one or more sensors. If the electronic device 400 moves, the electronic device 400 may obtain acceleration data through an acceleration sensor. If the electronic device 400 rotates, the electronic device 400 may obtain angular velocity data through a gyro sensor.

In operation 830, the electronic device 400 may determine whether the electronic device 400 is in a falling state. If the acceleration data or the angular velocity data is greater than a predetermined value, the electronic device 400 may determine that the electronic device 400 is in the falling state. If the acceleration data or the angular velocity data is less than the predetermined value, the electronic device 400 may continuously perform operation 820.

If it is determined that the electronic device 400 is in the falling state, in operation 840, the electronic device 400 may transmit a command to rotate the rotor of the accessory 600, to the accessory 600. According to some embodiments, the electronic device 400 may supply power for rotating the rotor to the accessory 600.

In operation 850, the accessory 600 may receive the command from the electronic device 400.

In operation 860, the accessory 600 may rotate the rotor depending on the received command. The falling speed of the electronic device 400 may be reduced and the direction in which the electronic device collides with the ground may be controlled, through the operation of the accessory 600.

Figure 9:
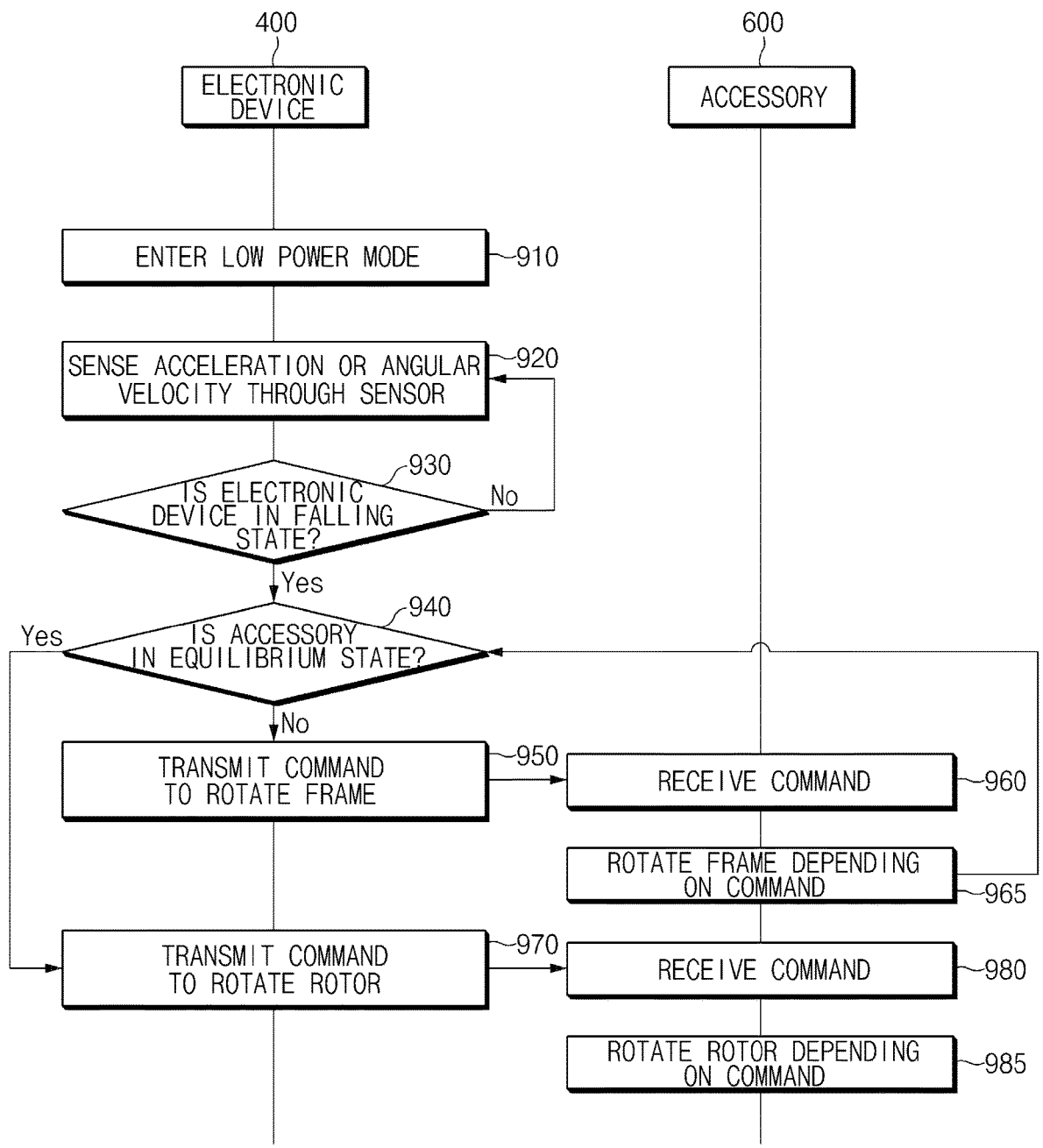
FIG. 9 is a flowchart illustrating a method of controlling an accessory, according to various embodiments of the present disclosure.

FIG. 9 is a flowchart illustrating a method of controlling an accessory, according to various embodiments of the present disclosure. For descriptive convenience, a description of an operation given with reference to FIGS. 7 and 8 will not be repeated here.

Referring to FIG. 9, in operation 910, the electronic device 400 may enter a low power mode.

In operation 920, the electronic device 400 may sense acceleration or angular velocity through one or more sensors.

In operation 930, the electronic device 400 may determine whether the electronic device 400 is in a falling state.

In operation 940, the electronic device 400 may determine whether the accessory 600 is in an equilibrium state. If a six-axis sensor is included in the accessory 600, the electronic device 400 may determine whether the accessory 600 is in the equilibrium state, based on the data sensed through the six-axis sensor of the accessory 600. The equilibrium state may mean a state where the accessory 600 is located such that the lift force generated by the rotor of the accessory 600 faces upward vertically. If the accessory 600 is not in the equilibrium state, since the direction of the lift force generated by the rotor of the accessory 600 does not face a direction opposite to the falling direction of the electronic device 400, the electronic device 400 may perform an operation of controlling the accessory 600 to be in an equilibrium state.

In operation 950, the electronic device 400 may transmit a command to rotate the frame of the accessory 600. If the accessory 600 is not in the equilibrium state, the electronic device 400 may transmit a command to rotate the frame of the accessory 600 for the purpose of equilibrating the accessory 600.

In operation 960, the accessory 600 may receive a command to rotate the frame of the accessory 600 from the electronic device 400.

In operation 965, the accessory 600 may rotate the frame depending on the command. The equilibrium state of the accessory 600 may be maintained by rotating the frame of the accessory 600.

If it is determined that the accessory 600 is in the equilibrium state, in operation 970, the electronic device 400 may transmit a command to rotate the rotor of the accessory 600, to the accessory 600. An embodiment is exemplified in FIG. 9 as operation 950 and operation 970 are separate operations. However, embodiments of the present disclosure may not be limited thereto. For example, the electronic device 400 may transmit a command to rotate the frame and a command to rotate the rotor to the accessory 600 at the same time.

In operation 980, the accessory 600 may receive the command from the electronic device 400.

In operation 985, the accessory 600 may rotate the rotor depending on the received command. The equilibrium state of the accessory 600 may be controlled, and thus the breakage due to falling of the electronic device 400 may be more effectively prevented by the accessory 600.

Figure 10:
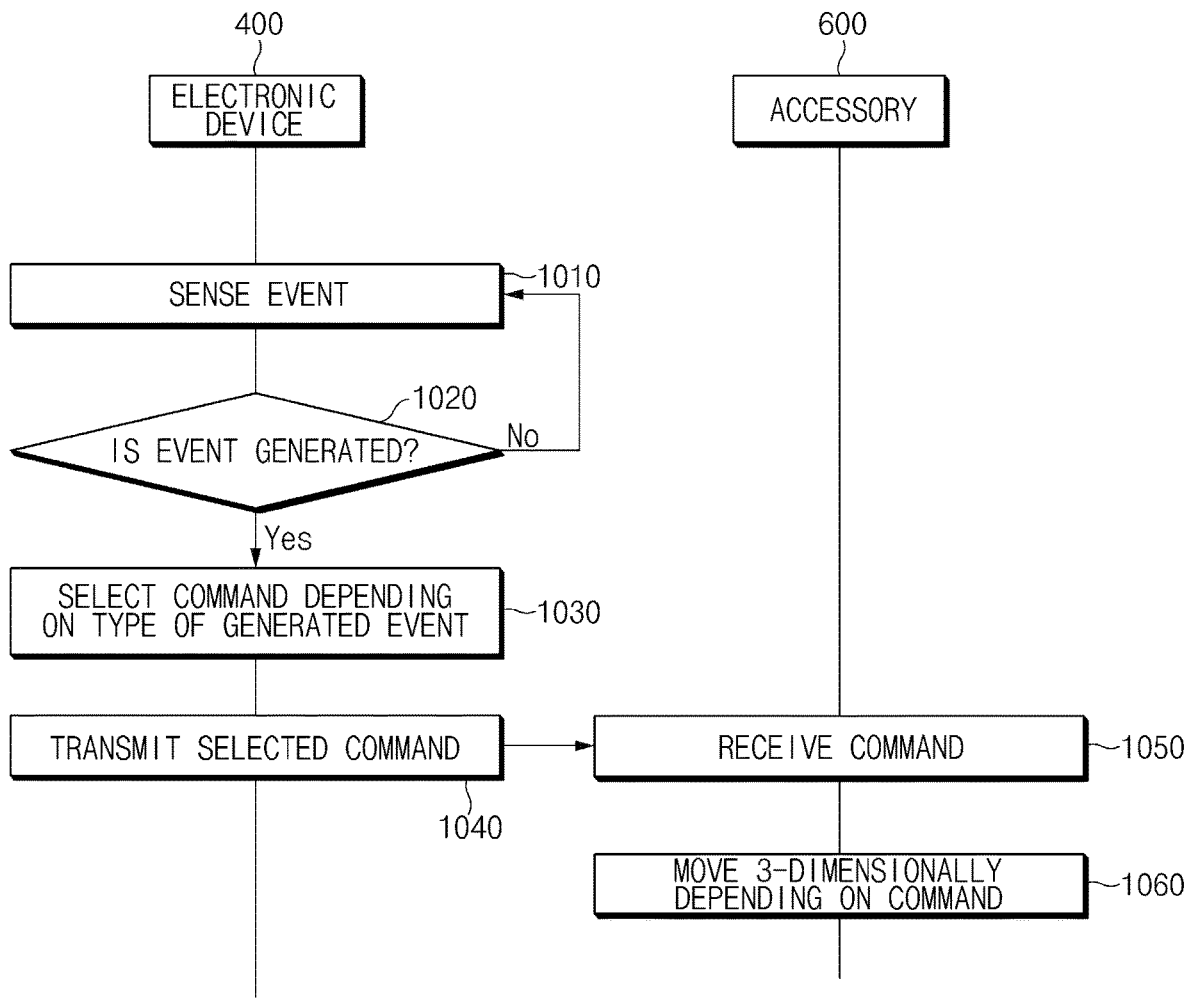
FIG. 10 is a flowchart illustrating a method of controlling an accessory, according to various embodiments of the present disclosure.

FIG. 10 is a flowchart illustrating a method of controlling an accessory, according to various embodiments of the present disclosure. For convenience of description, a description duplicated with an operation described with reference to FIG. 7 will not be repeated here.

Referring to FIG. 10, in operation 1010, the electronic device 400 may sense an event generated in the electronic device 400. For example, the event sensed by the electronic device 400 may be an event for notifying the user of the electronic device 400 such as message reception, a push notification, call reception, or the like.

In operation 1020, the electronic device 400 may determine whether an event is generated, and may determine a type of the generated event. For example, if it is determined that the event is generated, the electronic device 400 may determine whether the generated event is a type of an event among events such as the message reception, the push notification, the call reception, or the like. If the event is not generated, the electronic device 400 may continuously sense an event generated in the electronic device 400.

In operation 1030, the electronic device 400 may select a command to be transmitted to the accessory 600, depending on the type of the generated event. For example, if a message reception event is generated, the electronic device 400 may select a command to move the accessory 600 along square trajectory. For another example, if a push notification event is generated, the electronic device 400 may select a command to move the accessory 600 along trajectory (e.g., the trajectory may be in the "f" form if the push notification of Facebook application is received) indicating an application associated with a push notification. The trajectory corresponding to each application may be set by a user in advance. For another example, if a call reception event is generated, the electronic device 400 may select a command to move the accessory 600 along the trajectory (e.g., the trajectory may be in the "1" form if a call is received from the caller whose speed dial is set to "1") indicating the caller of a call. The trajectory corresponding to each caller may be set by a user in advance. The command selected by the electronic device 400 may include information about the above-mentioned trajectory.

In operation 1040, the electronic device 400 may transmit the selected command to the accessory 600.

In operation 1050, the accessory 600 may receive the command received from the electronic device 400.

In operation 1060, the accessory 600 may move depending on the received command. For example, if a message reception event is generated, the accessory 600 may move along square trajectory. For another example, if a push notification event is generated, the accessory 600 may move along depending on the trajectory indicating an application associated with the push notification. For another example, if a call reception event is generated, the accessory 600 may move along trajectory indicating the caller of a call. The accessory 600 may move based on information about the trajectory included in the command. The movement trajectory of the accessory 600 may be controlled depending on a type of an event when the event occurs, and thus, a user may visually verify the event generated the electronic device 400 from a long distance.

Figure 11:
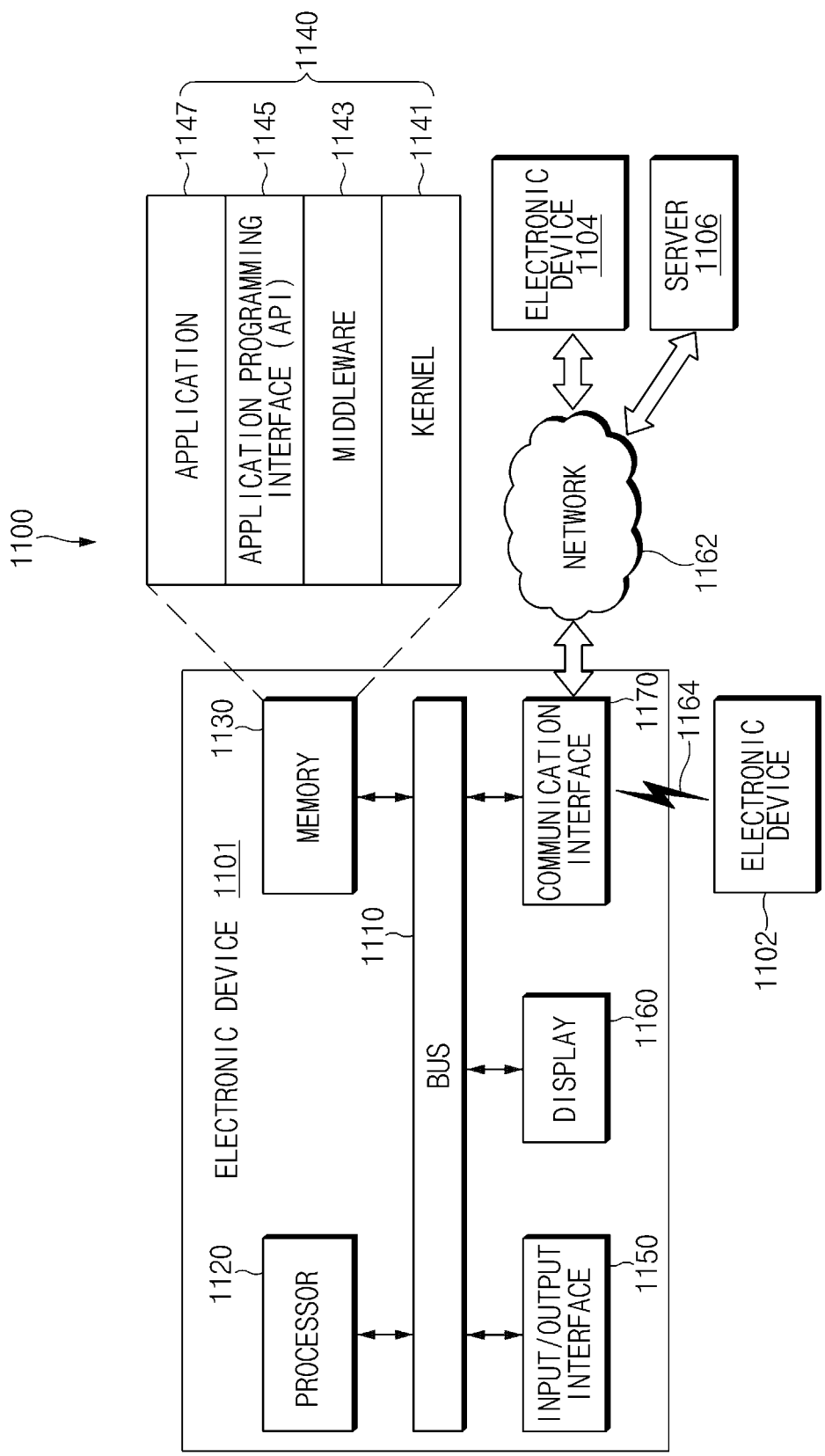
FIG. 11 illustrates an electronic device in a network environment, according to various embodiments.

FIG. 11 illustrates an electronic device in a network environment system, according to various embodiments.

Referring to FIG. 11, according to various embodiments, an electronic device 1101, 1102, or 1104, or a server 1106 may be connected each other over a network 1162 or a short range communication 1164. The electronic device 1101 may include a bus 1110, a processor 1120, a memory 1130, an input/output interface 1150, a display 1160, and a communication interface 1170. According to an embodiment, the electronic device 1101 may not include at least one of the above-described elements or may further include other element(s).

For example, the bus 1110 may interconnect the above-described elements 1120 to 1170 and may include a circuit for conveying communications (e.g., a control message and/or data) among the above-described elements.

The processor 1120 may include one or more of a central processing unit (CPU), an application processor (AP), or a communication processor (CP). For example, the processor 1120 may perform an arithmetic operation or data processing associated with control and/or communication of at least other elements of the electronic device 1101.

The memory 1130 may include a volatile and/or nonvolatile memory. For example, the memory 1130 may store instructions or data associated with at least one other element(s) of the electronic device 1101. According to an embodiment, the memory 1130 may store software and/or a program 1140. The program 1140 may include, for example, a kernel 1141, a middleware 1143, an application programming interface (API) 1145, and/or an application program (or "an application") 1147. At least a part of the kernel 1141, the middleware 1143, or the API 1145 may be referred to as an "operating system (OS)".

For example, the kernel 1141 may control or manage system resources (e.g., the bus 1110, the processor 1120, the memory 1130, and the like) that are used to execute operations or functions of other programs (e.g., the middleware 1143, the API 1145, and the application program 1147). Furthermore, the kernel 1141 may provide an interface that allows the middleware 1143, the API 1145, or the application program 1147 to access discrete elements of the electronic device 1101 so as to control or manage system resources.

The middleware 1143 may perform, for example, a mediation role such that the API 1145 or the application program 1147 communicates with the kernel 1141 to exchange data.

Furthermore, the middleware 1143 may process task requests received from the application program 1147 according to a priority. For example, the middleware 1143 may assign the priority, which makes it possible to use a system resource (e.g., the bus 1110, the processor 1120, the memory 1130, or the like) of the electronic device 1101, to at least one of the application program 1147. For example, the middleware 1143 may process the one or more task requests according to the priority assigned to the at least one, which makes it possible to perform scheduling or load balancing on the one or more task requests.

The API 1145 may be, for example, an interface through which the application program 1147 controls a function provided by the kernel 1141 or the middleware 1143, and may include, for example, at least one interface or function (e.g., an instruction) for a file control, a window control, image processing, a character control, or the like.

The input/output interface 1150 may play a role, for example, of an interface which transmits an instruction or data input from a user or another external device, to other element(s) of the electronic device 1101. Furthermore, the input/output interface 1150 may output an instruction or data, received from other element(s) of the electronic device 1101, to a user or another external device.

The display 1160 may include, for example, a liquid crystal display (LCD), a light-emitting diode (LED) display, an organic LED (OLED) display, a microelectromechanical systems (MEMS) display, or an electronic paper display. The display 1160 may display, for example, various contents (e.g., a text, an image, a video, an icon, a symbol, and the like) to a user. The display 1160 may include a touch screen and may receive, for example, a touch, gesture, proximity, or hovering input using an electronic pen or a part of a user's body.

For example, the communication interface 1170 may establish communication between the electronic device 1101 and an external device (e.g., the first electronic device 1102, the second electronic device 1104, or the server 1106). For example, the communication interface 1170 may be connected to the network 1162 over wireless communication or wired communication to communicate with the external device (e.g., the second electronic device 1104 or the server 1106).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 1164. The short range communication 1164 may include at least one of wireless fidelity (Wi-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 1101 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 1162 may include at least one of telecommunications networks, for example, a computer network (e.g., LAN or WAN), an Internet, or a telephone network.

Each of the first and second electronic devices 1102 and 1104 may be a device of which the type is different from or the same as that of the electronic device 1101. According to an embodiment, the server 1106 may include a group of one or more servers. According to various embodiments, all or a portion of operations that the electronic device 1101 will perform may be executed by another or plural electronic devices (e.g., the electronic device 1102 or 1104 or the server 1106). According to an embodiment, if the electronic device 1101 executes any function or service automatically or in response to a request, the electronic device 1101 may not perform the function or the service internally, but, alternatively additionally, it may request at least a portion of a function associated with the electronic device 1101 from another device (e.g., the electronic device 1102 or 1104 or the server 1106). The other electronic device (e.g., the electronic device 1102 or 1104 or the server 1106) may execute the requested function or additional function and may transmit the execution result to the electronic device 1101. The electronic device 1101 may provide the requested function or service using the received result or may additionally process the received result to provide the requested function or service. To this end, for example, cloud computing, distributed computing, or client-server computing may be used.

Figure 12:
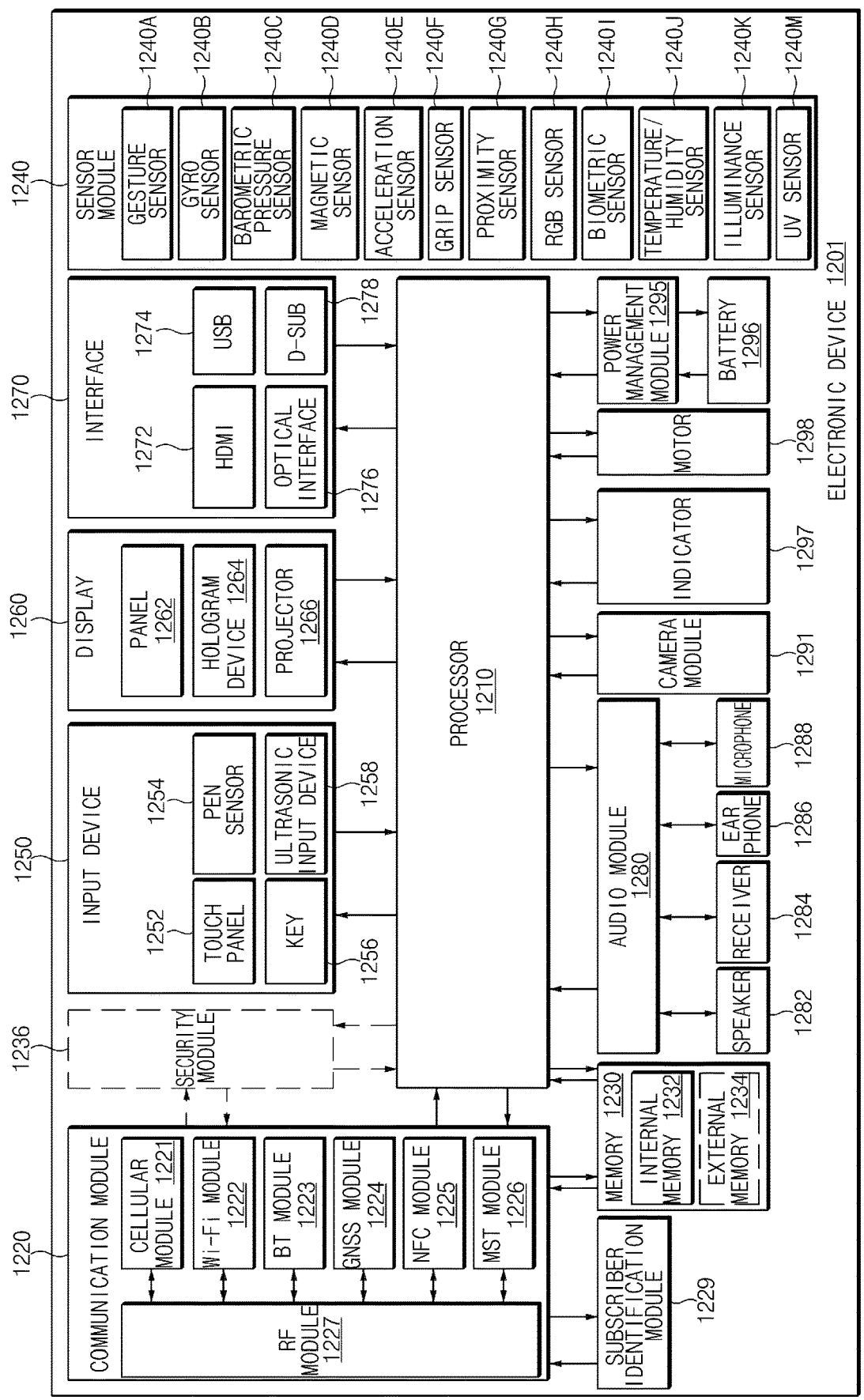
FIG. 12 illustrates a block diagram of the electronic device, according to various embodiments.

FIG. 12 illustrates a block diagram 1200 of an electronic device 1201, according to various embodiments.

Referring to FIG. 12, an electronic device 1201 may include, for example, all or a part of the electronic device 1101 illustrated in FIG. 11. The electronic device 1201 may include one or more processors (e.g., an application processor (AP)) 1210, a communication module 1220, a subscriber identification module 1229, a memory 1230, a sensor module 1240, an input device 1250, a display 1260, an interface 1270, an audio module 1280, a camera module 1291, a power management module 1295, a battery 1296, an indicator 1297, and a motor 1298.

The processor 1210 may drive, for example, an operating system (OS) or an application to control a plurality of hardware or software elements connected to the processor 1210 and may process and compute a variety of data. For example, the processor 1210 may be implemented with a System on Chip (SoC). According to an embodiment, the processor 1210 may further include a graphic processing unit (GPU) and/or an image signal processor. The processor 1210 may include at least a part (e.g., a cellular module 1221) of elements illustrated in FIG. 12. The processor 1210 may load a command or data, which is received from at least one of other elements (e.g., a nonvolatile memory), into a volatile memory and process the loaded command or data. The processor 1210 may store a variety of data in the nonvolatile memory.

The communication module 1220 may be configured the same as or similar to the communication interface 1170 of FIG. 11. The communication module 1220 may include the cellular module 1221, a Wi-Fi module 1222, a Bluetooth (BT) module 1223, a GNSS module 1224 (e.g., a GPS module, a Glonass module, a Beidou module, or a Galileo module), a near field communication (NFC) module 1225, a MST module 1226 and a radio frequency (RF) module 1227.

The cellular module 1221 may provide, for example, voice communication, video communication, a character service, an Internet service, or the like over a communication network. According to an embodiment, the cellular module 1221 may perform discrimination and authentication of the electronic device 1201 within a communication network by using the subscriber identification module (e.g., a SIM card) 1229. According to an embodiment, the cellular module 1221 may perform at least a portion of functions that the processor 1210 provides. According to an embodiment, the cellular module 1221 may include a communication processor (CP).

Each of the Wi-Fi module 1222, the BT module 1223, the GNSS module 1224, the NFC module 1225, or the MST module 1226 may include a processor for processing data exchanged through a corresponding module, for example. According to an embodiment, at least a part (e.g., two or more) of the cellular module 1221, the Wi-Fi module 1222, the BT module 1223, the GNSS module 1224, the NFC module 1225, or the MST module 1226 may be included within one Integrated Circuit (IC) or an IC package.

For example, the RF module 1227 may transmit and receive a communication signal (e.g., an RF signal). For example, the RF module 1227 may include a transceiver, a power amplifier module (PAM), a frequency filter, a low noise amplifier (LNA), an antenna, or the like. According to another embodiment, at least one of the cellular module 1221, the Wi-Fi module 1222, the BT module 1223, the GNSS module 1224, the NFC module 1225, or the MST module 1226 may transmit and receive an RF signal through a separate RF module.

The subscriber identification module 1229 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 1230 (e.g., the memory 1130) may include an internal memory 1232 or an external memory 1234. For example, the internal memory 1232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1234 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1234 may be operatively and/or physically connected to the electronic device 1201 through various interfaces.

A security module 1236 may be a module that includes a storage space of which a security level is higher than that of the memory 1230 and may be a circuit that guarantees safe data storage and a protected execution environment. The security module 1236 may be implemented with a separate circuit and may include a separate processor. For example, the security module 1236 may be in a smart chip or a secure digital (SD) card, which is removable, or may include an embedded secure element (eSE) embedded in a fixed chip of the electronic device 1201. Furthermore, the security module 1236 may operate based on an operating system (OS) that is different from the OS of the electronic device 1201. For example, the security module 1236 may operate based on java card open platform (JCOP) OS.

The sensor module 1240 may measure, for example, a physical quantity or may detect an operation state of the electronic device 1201. The sensor module 1240 may convert the measured or detected information to an electric signal. For example, the sensor module 1240 may include at least one of a gesture sensor 1240A, a gyro sensor 1240B, a barometric pressure sensor 1240C, a magnetic sensor 1240D, an acceleration sensor 1240E, a grip sensor 1240F, the proximity sensor 1240G, a color sensor 1240H (e.g., red, green, blue (RGB) sensor), a biometric sensor 1240I, a temperature/humidity sensor 1240J, an illuminance sensor 1240K, or an UV sensor 1240M. Although not illustrated, additionally or generally, the sensor module 1240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1240 may further include a control circuit for controlling at least one or more sensors included therein. According to an embodiment, the electronic device 1201 may further include a processor that is a part of the processor 1210 or independent of the processor 1210 and is configured to control the sensor module 1240. The processor may control the sensor module 1240 while the processor 1210 remains at a sleep state.

The input device 1250 may include, for example, a touch panel 1252, a (digital) pen sensor 1254, a key 1256, or an ultrasonic input unit 1258. For example, the touch panel 1252 may use at least one of capacitive, resistive, infrared and ultrasonic detecting methods. Also, the touch panel 1252 may further include a control circuit. The touch panel 1252 may further include a tactile layer to provide a tactile reaction to a user.

The (digital) pen sensor 1254 may be, for example, a part of a touch panel or may include an additional sheet for recognition. The key 1256 may include, for example, a physical button, an optical key, a keypad, or the like. The ultrasonic input device 1258 may detect (or sense) an ultrasonic signal, which is generated from an input device, through a microphone (e.g., a microphone 1288) and may check data corresponding to the detected ultrasonic signal.

The display 1260 (e.g., the display 1160) may include a panel 1262, a hologram device 1264, or a projector 1266. The panel 1262 may be the same as or similar to the display 1160 illustrated in FIG. 11. The panel 1262 may be implemented, for example, to be flexible, transparent or wearable. The panel 1262 and the touch panel 1252 may be integrated into a single module. The hologram device 1264 may display a stereoscopic image in a space using a light interference phenomenon. The projector 1266 may project light onto a screen so as to display an image. For example, the screen may be arranged in the inside or the outside of the electronic device 1201. According to an embodiment, the display 1260 may further include a control circuit for controlling the panel 1262, the hologram device 1264, or the projector 1266.

The interface 1270 may include, for example, a high-definition multimedia interface (HDMI) 1272, a universal serial bus (USB) 1274, an optical interface 1276, or a D-subminiature (D-sub) 1278. The interface 1270 may be included, for example, in the communication interface 1170 illustrated in FIG. 11. Additionally or generally, the interface 1270 may include, for example, a mobile high definition link (MHL) interface, a SD card/multi-media card (MMC) interface, or an infrared data association (IrDA) standard interface.

The audio module 1280 may convert a sound and an electric signal in dual directions. At least a part of the audio module 1280 may be included, for example, in the input/output interface 1150 illustrated in FIG. 11. The audio module 1280 may process, for example, sound information that is input or output through a speaker 1282, a receiver 1284, an earphone 1286, or the microphone 1288.

For example, the camera module 1291 may shoot a still image or a video. According to an embodiment, the camera module 1291 may include at least one or more image sensors (e.g., a front sensor or a rear sensor), a lens, an image signal processor (ISP), or a flash (e.g., an LED or a xenon lamp).

The power management module 1295 may manage, for example, power of the electronic device 1201. According to an embodiment, a power management integrated circuit (PMIC), a charger IC, or a battery or fuel gauge may be included in the power management module 1295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1296 and a voltage, current or temperature thereof while the battery is charged. The battery 1296 may include, for example, a rechargeable battery and/or a solar battery.

The indicator 1297 may display a specific state of the electronic device 1201 or a part thereof (e.g., the processor 1210), such as a booting state, a message state, a charging state, and the like. The motor 1298 may convert an electrical signal into a mechanical vibration and may generate the following effects: vibration, haptic, and the like. Although not illustrated, a processing device (e.g., a GPU) for supporting a mobile TV may be included in the electronic device 1201. The processing device for supporting the mobile TV may process media data according to the standards of digital multimedia broadcasting (DMB), digital video broadcasting (DVB), MediaFlo™, or the like.

Each of the above-mentioned elements of the electronic device according to various embodiments of the present disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 13:
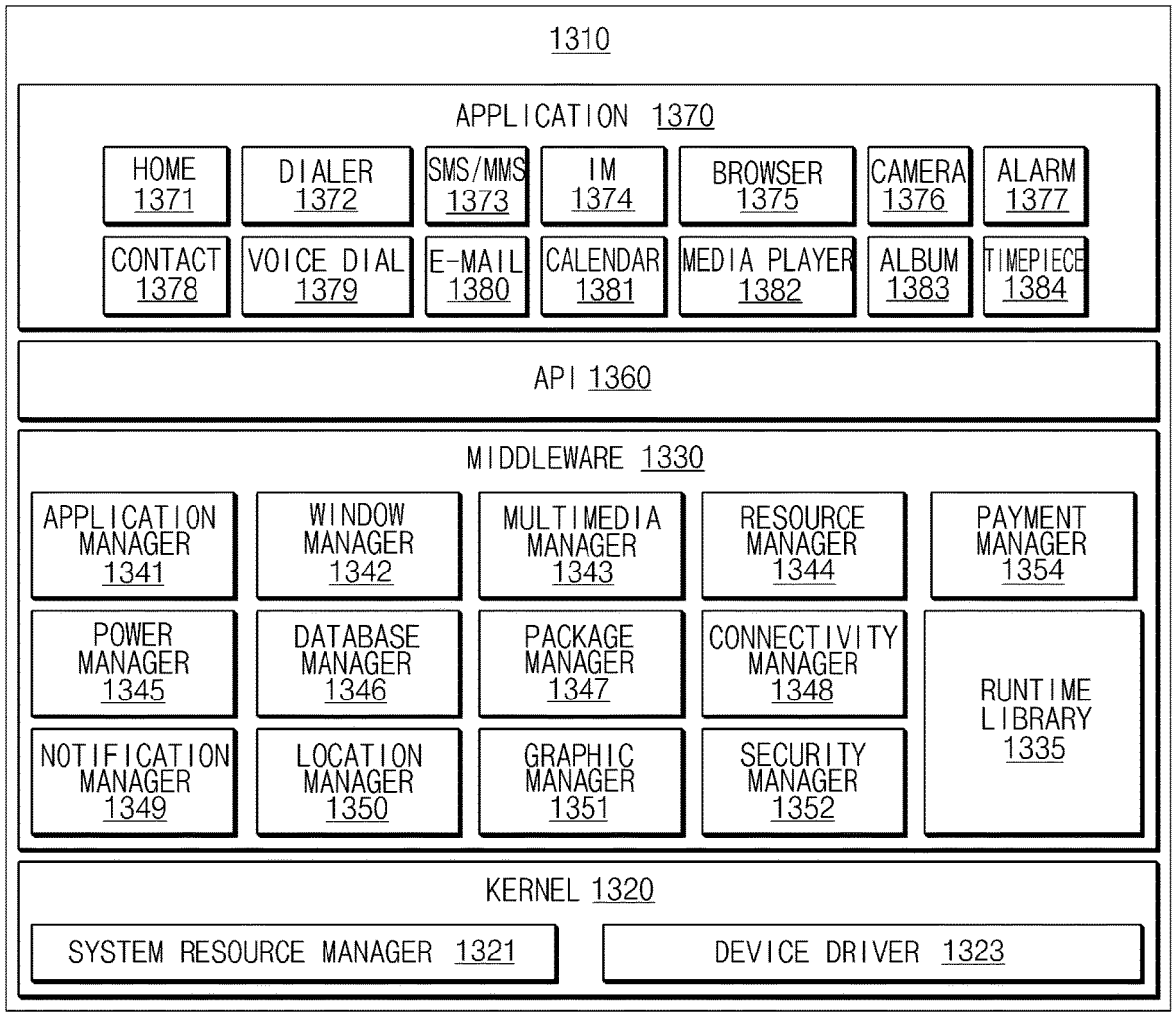
FIG. 13 illustrates a block diagram of a program module, according to various embodiments.

FIG. 13 illustrates a block diagram of a program module, according to various embodiments.

According to an embodiment, a program module 1310 (e.g., the program 1140) may include an operating system (OS) to control resources associated with an electronic device (e.g., the electronic device 1101), and/or diverse applications (e.g., the application program 1147) driven on the OS. The OS may be, for example, Android, iOS, Windows, Symbian, Tizen, bada, or the like.

The program module 1310 may include a kernel 1320, a middleware 1330, an application programming interface (API) 1360, and/or an application 1370. At least a portion of the program module 1310 may be preloaded on an electronic device or may be downloadable from an external electronic device (e.g., the first electronic device 1102, the second electronic device 1104, the server 1106, or the like).

The kernel 1320 (e.g., the kernel 1141) may include, for example, a system resource manager 1321 or a device driver 1323. The system resource manager 1321 may perform control, allocation, or retrieval of system resources. According to an embodiment, the system resource manager 1321 may include a process managing unit, a memory managing unit, or a file system managing unit. The device driver 1323 may include, for example, a display driver, a camera driver, a Bluetooth driver, a shared memory driver, a USB driver, a keypad driver, a Wi-Fi driver, an audio driver, or an inter-process communication (IPC) driver.

The middleware 1330 may provide, for example, a function that the application 1370 needs in common, or may provide diverse functions to the application 1370 through the API 1360 to allow the application 1370 to efficiently use limited system resources of the electronic device. According to an embodiment, the middleware 1330 (e.g., the middleware 1143) may include at least one of a runtime library 1335, an application manager 1341, a window manager 1342, a multimedia manager 1343, a resource manager 1344, a power manager 1345, a database manager 1346, a package manager 1347, a connectivity manager 1348, a notification manager 1349, a location manager 1350, a graphic manager 1351, a security manager 1352, or a payment manager 1354.

The runtime library 1335 may include, for example, a library module that is used by a compiler to add a new function through a programming language while the application 1370 is being executed. The runtime library 1335 may perform input/output management, memory management, or capacities about arithmetic functions.

The application manager 1341 may manage, for example, a life cycle of at least one application of the application 1370. The window manager 1342 may manage a graphic user interface (GUI) resource that is used in a screen. The multimedia manager 1343 may identify a format necessary for playing diverse media files, and may perform encoding or decoding of media files by using a codec suitable for the format. The resource manager 1344 may manage resources such as a storage space, memory, or source code of at least one application of the application 1370.

The power manager 1345 may operate, for example, with a basic input/output system (BIOS) to manage a battery or power, and may provide power information for an operation of an electronic device. The database manager 1346 may generate, search for, or modify database that is to be used in at least one application of the application 1370. The package manager 1347 may install or update an application that is distributed in the form of package file.

The connectivity manager 1348 may manage, for example, wireless connection such as Wi-Fi or Bluetooth. The notification manager 1349 may display or notify an event such as arrival message, appointment, or proximity notification in a mode that does not disturb a user. The location manager 1350 may manage location information about an electronic device. The graphic manager 1351 may manage a graphic effect that is provided to a user, or manage a user interface relevant thereto. The security manager 1352 may provide a general security function necessary for system security, user authentication, or the like. According to an embodiment, if an electronic device (e.g., the electronic device 1101) includes a telephony function, the middleware 1330 may further include a telephony manager for managing a voice or video call function of the electronic device.

The middleware 1330 may include a middleware module that combines diverse functions of the above-described elements. The middleware 1330 may provide a module specialized to each OS kind to provide differentiated functions. Additionally, the middleware 1330 may dynamically remove a part of the preexisting elements or may add new elements thereto.

The API 1360 (e.g., the API 1145) may be, for example, a set of programming functions and may be provided with a configuration that is variable depending on an OS. For example, if an OS is Android or iOS, it may provide one API set per platform. If an OS is Tizen, it may provide two or more API sets per platform.

The application 1370 (e.g., the application program 1147) may include, for example, one or more applications capable of providing functions for a home 1371, a dialer 1372, an SMS/MMS 1373, an instant message (IM) 1374, a browser 1375, a camera 1376, an alarm 1377, a contact 1378, a voice dial 1379, an e-mail 1380, a calendar 1381, a media player 1382, an album 1383, and a timepiece 1384 or for offering health care (e.g., measuring an exercise quantity, blood sugar, or the like) or environment information (e.g., information of barometric pressure, humidity, temperature, or the like).

According to an embodiment, the application 1370 may include an application (hereinafter referred to as "information exchanging application" for descriptive convenience) to support information exchange between an electronic device (e.g., the electronic device 1101) and an external electronic device (e.g., the electronic device 1102 or 1104). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device (e.g., the electronic device 1102 or 1104). Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of elements) or adjustment of brightness (or resolution) of a display) of the external electronic device (e.g., the electronic device 1102 or 1104) which communicates with the electronic device, an application running in the external electronic device, or a service (e.g., a call service, a message service, or the like) provided from the external electronic device.

According to an embodiment, the application 1370 may include an application (e.g., a health care application of a mobile medical device) that is assigned in accordance with an attribute of an external electronic device (e.g., the electronic device 1102 or 1104). According to an embodiment, the application 1370 may include an application that is received from an external electronic device (e.g., the first electronic device 1102, the second electronic device 1104, or the server 1106). According to an embodiment, the application 1370 may include a preloaded application or a third party application that is downloadable from a server. The names of elements of the program module 1310 according to the embodiment may be modifiable depending on kinds of operating systems.

According to various embodiments, at least a portion of the program module 1310 may be implemented by software, firmware, hardware, or a combination of two or more thereof. At least a portion of the program module 1310 may be implemented (e.g., executed), for example, by the processor (e.g., the processor 1210). At least a portion of the program module 1310 may include, for example, modules, programs, routines, sets of instructions, processes, or the like for performing one or more functions.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 1120), may cause the one or more processors to perform a function corresponding to the instruction. The computer-readable storage media, for example, may be the memory 1130.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An electronic device comprising:
   an input/output interface capable of being electrically connected to a 3-dimensional movable accessory;
   a processor electrically connected to the input/output interface; and
   one or more sensors,
   wherein the processor is configured to:
   sense an event generated in the electronic device,
   determine a falling state of the electronic device based on data obtained by the one or more sensors, and
   if it is determined that the electronic device is in the falling state, transmit a command to operate the 3-dimensional movable accessory so as to generate force in a direction opposite to a falling direction of the electronic device, to the 3-dimensional movable accessory through the input/output interface.

2. The electronic device of claim 1, wherein the one or more sensors include an acceleration sensor or a gyro sensor.

3. The electronic device of claim 2, wherein the processor is configured to:
   determine the falling state of the electronic device based on acceleration data or angular velocity data obtained by the acceleration sensor or the gyro sensor.

4. The electronic device of claim 3, wherein the processor is configured to:
   if it is determined that the electronic device is in the falling state, transmit a command to rotate a rotor of the 3-dimensional movable accessory configured to generate lift force, to the 3-dimensional movable accessory through the input/output interface.

5. The electronic device of claim 4, wherein the processor is configured to:
   if it is determined that the electronic device is in the falling state, transmit a command to rotate a frame configured to surround the rotor, to the 3-dimensional movable accessory through the input/output interface to maintain balance of the 3-dimensional movable accessory.

6. The electronic device of claim 1, wherein the processor is a low power processor, and
   wherein the processor is configured to:
   sense the event in a low power mode; and
   transmit the command.

7. The electronic device of claim 1, wherein the processor is configured to:
   transmit a command to operate an LED or a speaker included in the 3-dimensional movable accessory, to the 3-dimensional movable accessory through the input/output interface.

8. The electronic device of claim 1, wherein the input/output interface supplies power to the 3-dimensional movable accessory.

9. The electronic device of claim 1, wherein the input/output interface is an ear jack or a USB port.

10. A method performed by an electronic device, the method comprising:
    sensing an event generated in the electronic device;
    determining a falling state of the electronic device based on data obtained by one or more sensors; and transmitting a command to operate a 3-dimensional movable accessory electrically connected to the electronic device so as to generate a lift force, to the 3-dimensional movable accessory in response to the falling state.

11. A system comprising:
an electronic device comprising:
  an input/output interface;
  one or more sensors; and
  a processor electrically connected to the input/output interface; and
an accessory electrically connected to the electronic device, the accessory comprising:
  a connection part electrically connected to the input/output interface; and
  a movement part electrically connected to the connection part,
wherein the processor is configured to:
  sense an event generated in the electronic device,
  determine a falling state of the electronic device based on data obtained by the one or more sensors, and
  if it is determined that the electronic device is in the falling state, transmit a command to operate the accessory so as to generate a lift force, to the accessory through the input/output interface, and
wherein the movement part is configured to:
  3-dimensionally move the accessory in response to the command received through the connection part.

* * * * *